(12) United States Patent
Yu

(10) Patent No.: US 8,050,552 B2
(45) Date of Patent: Nov. 1, 2011

(54) ERGONOMIC PHOTOGRAPHIC DEVICE

(75) Inventor: Chia-Ming Yu, Taichung (TW)

(73) Assignee: Ability Enterprise Co., Ltd., Taipei (TW)

( * ) Notice: Subject to any disclaimer, the term of this patent is extended or adjusted under 35 U.S.C. 154(b) by 0 days.

(21) Appl. No.: 12/721,908

(22) Filed: Mar. 11, 2010

(65) Prior Publication Data

US 2011/0176800 A1    Jul. 21, 2011

(30) Foreign Application Priority Data

Jan. 21, 2010   (TW) ............................... 99101568 A

(51) Int. Cl.
*G03B 17/02* (2006.01)
(52) U.S. Cl. .................................................. 396/540
(58) Field of Classification Search ............... 396/540
See application file for complete search history.

(56) References Cited

U.S. PATENT DOCUMENTS

| 6,147,711 | A * | 11/2000 | Kawase et al. ............. 348/376 |
| 6,175,691 | B1 | 1/2001 | Douglas |
| 7,375,881 | B2 * | 5/2008 | Regan et al. ................ 359/431 |
| 7,477,316 | B2 * | 1/2009 | Nakamura et al. .......... 348/375 |
| 2006/0141343 | A1 | 6/2006 | Tsutsumi |
| 2007/0236808 | A1 * | 10/2007 | Morita ......................... 359/700 |
| 2008/0131097 | A1 * | 6/2008 | Okazaki ........................ 386/126 |
| 2008/0273108 | A1 * | 11/2008 | Tsutsumi .................. 348/333.01 |
| 2009/0003821 | A1 * | 1/2009 | Son .............................. 396/423 |

FOREIGN PATENT DOCUMENTS

| EP | 1575268 A3 | 12/2005 |
| EP | 1901548 A3 | 5/2011 |
| JP | 2008263496 A | 10/2008 |
| WO | 2006047630 A2 | 5/2006 |

OTHER PUBLICATIONS

Iijima et al., "A User-Friendly Video Camera Based on Ergonomic Studies", Jan. 9-13, 2008, International Conference on Consumer Electronics, 2008, pp. 1-2.*
Imaging Resources, Jan. 6, 2010, International Consumer Electronics Show, Jan. 7-10, 2010, Las Vegas, NV, "Press Release: Samsung Announces Three New Stylish, Ergonomic Camcorders".*
European Search Report, EP 10250685, mailed Jul. 2, 2010.

* cited by examiner

*Primary Examiner* — Rodney Fuller
*Assistant Examiner* — Linda B Smith
(74) *Attorney, Agent, or Firm* — Stout, Uxa, Buyan & Mullins, LLP

(57) ABSTRACT

An ergonomic photographic device includes a camera and a shell. The shell has a front portion and a back portion, with the camera being disposed in the front portion. The back portion has a leaning portion which is capable of accommodating leaning of the palm of a user. When the arm and wrist of the user are kept at a neutral angle, the camera is kept at a horizontal angle.

12 Claims, 2 Drawing Sheets

ERGONOMIC PHOTOGRAPHIC DEVICE

CROSS-REFERENCE TO RELATED APPLICATIONS

The entire contents of Taiwan Patent Application No. 099101568, filed on Jan. 21, 2010, from which this application claims priority, are incorporated herein by reference.

BACKGROUND OF THE INVENTION

1. Field of the Invention

The present invention generally relates to a photographic device, and more particularly to an ergonomic photographic device.

2. Description of Related Art

As technology advances, digital video cameras have become much more popular in the daily lives of common consumers. However, using a typical digital video camera for a long period of time often results in fatigue to the consumer. For example, use of a digital video camera for a long period of time usually imparts pain in the arm and wrist, wherein the pain is similar to that caused by over-exercise or over-fatigue.

For the reason that there are some disadvantages of the prior art as mentioned, a need exists to propose an ergonomic photographic device so as to meet ongoing, evolving and even increasing consumer needs.

SUMMARY OF THE INVENTION

Accordingly, the present invention has been made in order to meet such a need as described above, and it is an object of the present invention to provide an ergonomic photographic device so as to meet consumer needs.

In order to achieve the object, the present invention provides an ergonomic photographic device. The ergonomic photographic device includes a camera and a shell. The shell has a front portion and a back portion, with the camera being disposed in the front portion. The back portion has a leaning portion which is capable of accommodating leaning of the palm of a user. When the arm and wrist of the user are kept at a neutral angle, the camera is kept at a horizontal angle.

DETAILED DESCRIPTION OF THE INVENTION

The detailed description of the present invention will be discussed in the following embodiments, which are not intended to limit the scope of the present invention, but can be adapted for other applications. While drawings are illustrated in detail, it is appreciated that the quantity of the disclosed components may be greater or less than that disclosed, except where expressly restricting the amount of the components.

Figure 1A:
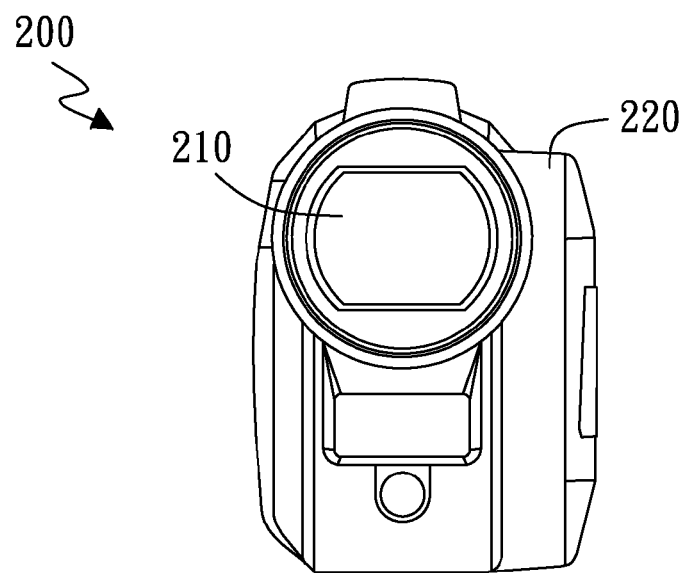
FIGS. 1A and 1B show front and perspective views, respectively, of an ergonomic photographic device in accordance with an embodiment of the present invention.
Figure 1B:
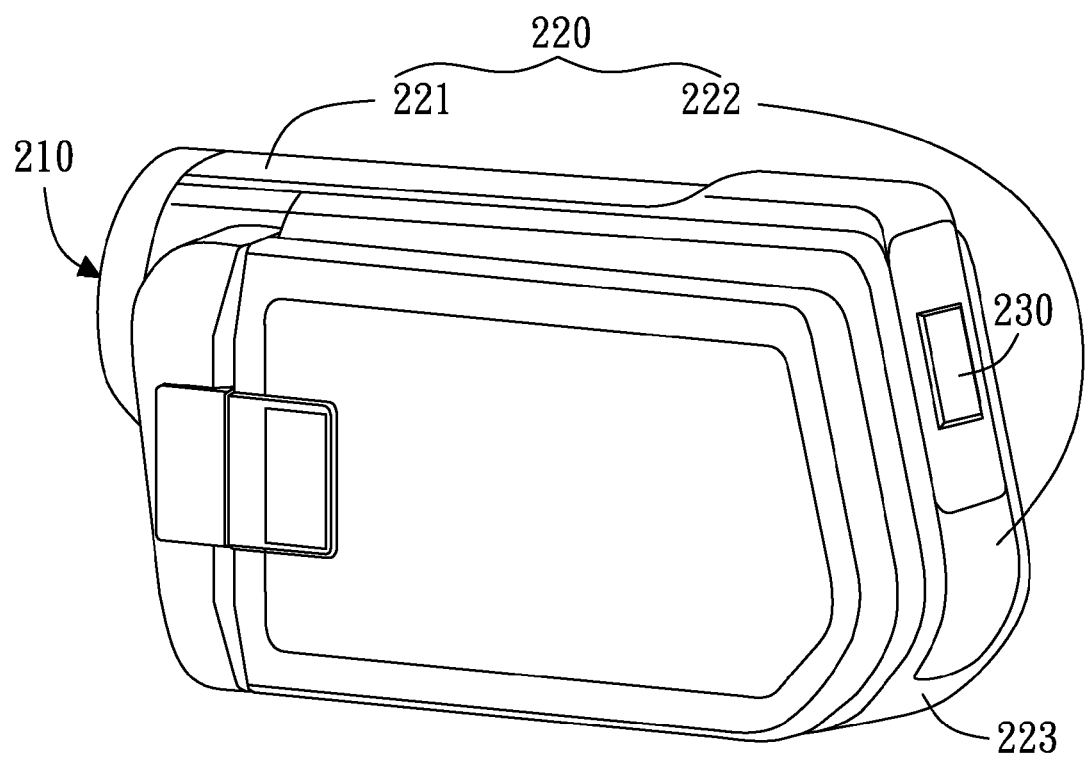

FIG. 1A and FIG. 1B show a front view and a perspective view, respectively, of an ergonomic photographic device 200 in accordance with an embodiment of the present invention. The ergonomic photographic device 200 includes a camera 210 and a shell 220. The shell 220 has a front portion 221 and a back portion 222. The camera 210 is disposed in the front portion 221. The back portion 222 has a leaning portion 223 which is capable of accommodating leaning of the palm of a user. When the arm and wrist of the user are kept at a neutral angle, the camera 210 is maintained (e.g., kept) at a horizontal angle. In other words, the ergonomic photographic device 200 is structured such that arrangement of the user's arm and wrist at a neutral angle orients the camera 210 at a horizontal angle. According to ergonomic reference values of human hand size and operation angle, the neutral angle mentioned above is about 5 to 15 degrees.

By way of the design mentioned above, the camera 210 is kept at a horizontal angle without the user adjusting (e.g., without deliberately trying to adjust) the angle between his or her arm and wrist. Therefore, using the ergonomic photographic device 200 for a long period of time will not fatigue (or will reduce fatigue of) the arm and wrist of the user (e.g., in comparison to the typical digital video camera).

In this embodiment, the back portion 222 has an input device 230. When the arm and wrist of the user are kept at the neutral angle mentioned above, the thumb of the user can press the input device 230 directly (e.g., conveniently or readily) for controlling the ergonomic photographic device 200 without performing any angle adjustment and/or without repositioning of the user's arm and/or wrist. By way of the design mentioned above, according to a particular implementation, the user can control the ergonomic photographic device 200 without adjusting (e.g., without deliberately trying to adjust) the position of the thumb of the user. Therefore, using the ergonomic photographic device 200 for a long period of time will not fatigue (or will reduce fatigue of) the palm and the thumb of the user (e.g., in comparison to the typical digital video camera).

Figure 1C:
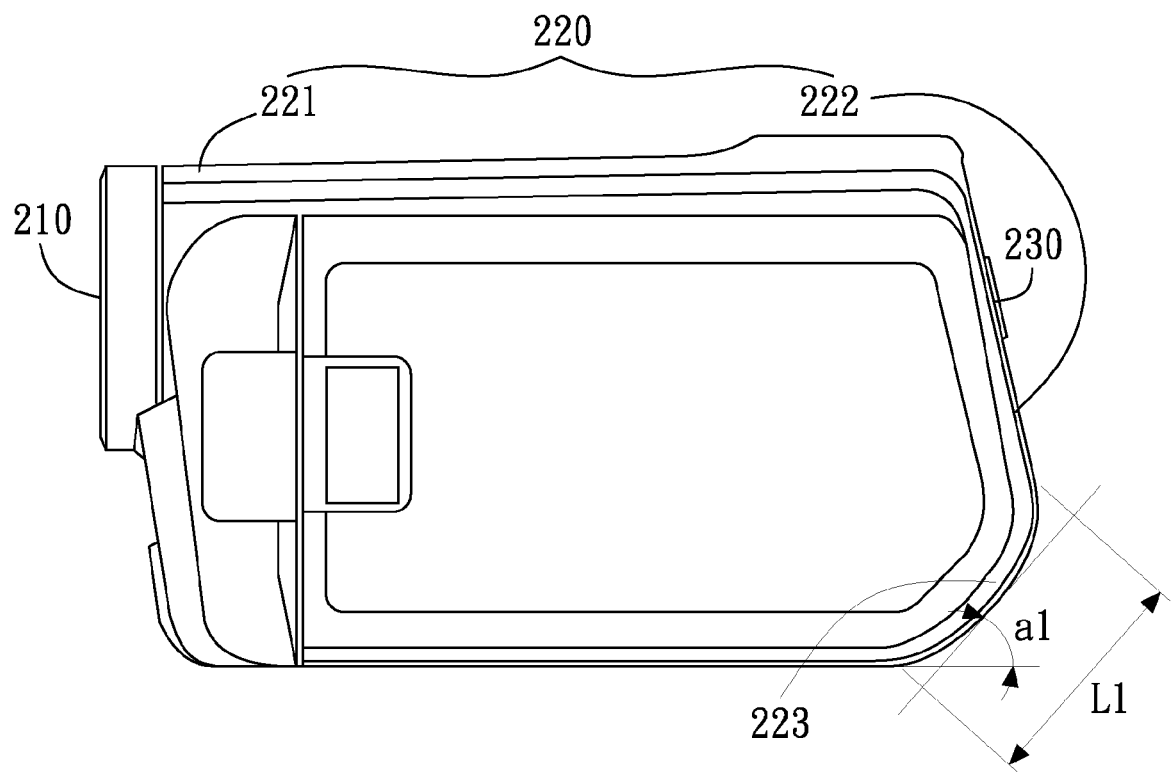
FIG. 1C shows a side view of the ergonomic photographic device of FIG. 1B.

FIG. 1C shows a side view of the ergonomic photographic device 200 shown in FIG. 1B. The leaning portion 223 has a curved structure. The curved structure is capable of accommodating leaning of the palm portion below the thumb of the user. There is an oblique angle $a_1$ between the curved structure and the horizontal angle. The oblique angle $a_1$ is about 10 to 70 degrees, wherein the oblique angle $a_1$ is preferred to be about 40 to 50 degrees. Moreover, the curved structure has an oblique width $L_1$, wherein the oblique width $L_1$ is preferred to be about 20 to 30 mm.

By way of the design mentioned above, the palm of the user can lean onto the leaning portion 223 comfortably, and the camera 210 is kept at a horizontal angle without the user adjusting the angle between his or her arm and wrist deliberately.

The ergonomic photographic device 200 of the present invention can address, meet, or, preferably, totally meet, all consumer needs. For example, the camera 210 is kept at a horizontal angle with a reduced or eliminated need for the user to adjust the angle between his or her arm and wrist deliberately. Therefore, using the ergonomic photographic device 200 for a long period of time will reduce or eliminate fatigue in the arm and wrist of the user. Moreover, the user can control the ergonomic photographic device 200 with a reduced or eliminated need for the user to adjust the position of his or her thumb deliberately. Therefore, using the ergonomic photographic device 200 for a long period of time will reduce or eliminate fatigue in the palm and the thumb of the user.

Although specific embodiments have been illustrated and described, it will be appreciated by those skilled in the art that various modifications may be made without departing from the scope of the present invention, which is intended to be limited solely by the appended claims.

What is claimed is:

1. An ergonomic photographic device, comprising:
a camera: and
a shell, said shell having a front portion and a back portion, said camera being disposed in said front portion, wherein said back portion has a leaning portion capable of accommodating leaning of the palm of a user, wherein the device is structured such that arrangement of the arm and wrist of said user at a neutral angle orients the camera at a horizontal angle, and wherein said leaning portion has a curved structure with an oblique width of about 20 to 30 mm.

2. The ergonomic photographic device according to claim 1, wherein said back portion has an input device, and when the arm and wrist of the user are kept at said neutral angle the thumb of said user is capable of pressing said input device for controlling said ergonomic photographic device without performing any angle adjustment.

3. The ergonomic photographic device according to claim 1, wherein said neutral angle is about 5 to 15 degrees.

4. The ergonomic photographic device according to claim 1, wherein said curved structure is capable of accommodating leaning of the palm portion below the thumb of the user.

5. The ergonomic photographic device according to claim 1, wherein an oblique angle exists between said curved structure and said horizontal angle, said oblique angle being about 10 to 70 degrees.

6. The ergonomic photographic device according to claim 1, wherein an oblique angle exists between said curved structure and said horizontal angle, said oblique angle being about 40 to 50 degrees.

7. A method for using a photographic device, comprising:
providing a photographic device, said photographic device having a camera and a shell, said shell having a front portion and a back portion, said camera being disposed in said front portion, said back portion having a leaning portion; and
holding said photographic device by a user, wherein said leaning portion accommodates leaning of the palm of said user, whereby when the arm and wrist of said user are kept at a neutral angle the camera is kept at a horizontal angle, and wherein said leaning portion has a curved, structure with an oblique width of about 20 to 30 mm.

8. The method for using a photographic device according to claim 7, wherein said back portion has an input device, and with the arm and wrist of said user kept at said neutral angle the thumb of said user presses said input device for controlling said ergonomic photographic device without performing any angle adjustment.

9. The method for using a photographic device according to claim 7, wherein said neutral angle is about 5 to 15 degrees.

10. The method for using a photographic device according to claim 7, said curved structure accommodating leaning of the palm portion below the thumb of the user.

11. The method for using a photographic device according to claim 7, wherein an oblique angle exists between said curved structure and said horizontal angle, said oblique angle being about 10 to 70 degrees.

12. The method for using a photographic device according to claim 7, wherein an oblique angle exists between said curved structure and said horizontal angle, said oblique angle being about 40 to 50 degrees.

* * * * *